United States Patent [19]
Gauthy et al.

[11] Patent Number: 5,635,567
[45] Date of Patent: Jun. 3, 1997

[54] PROPYLENE POLYMER, PROCESS FOR OBTAINING IT AND USE

[75] Inventors: Fernand Gauthy, Wemmel; Eric Vandevijver, Brussels; Martine Kaszacs, Braine-l'Alleud, all of Belgium

[73] Assignee: Solvay (Société Anonyme), Brussels, Belgium

[21] Appl. No.: 574,185

[22] Filed: Dec. 18, 1995

[30] Foreign Application Priority Data

Dec. 19, 1994 [BE] Belgium ............................ 09401138

[51] Int. Cl.$^6$ ............................ C08L 23/10; C08L 23/26
[52] U.S. Cl. ............................ 525/322; 525/193
[58] Field of Search ............................ 525/322; 4/193

[56] References Cited

FOREIGN PATENT DOCUMENTS

| 0523313 | 3/1983 | Japan . |
| 0188412 | 9/1985 | Japan . |
| 6122792 | 5/1994 | Japan . |

*Primary Examiner*—Irina S. Zemel
*Attorney, Agent, or Firm*—Spencer & Frank

[57] ABSTRACT

Propylene polymer containing monomer units derived from at least one functional compound (A) comprising at least two vinyl unsaturations and one or a number of aromatic rings which exhibits a structural stress-hardening.

32 Claims, 1 Drawing Sheet

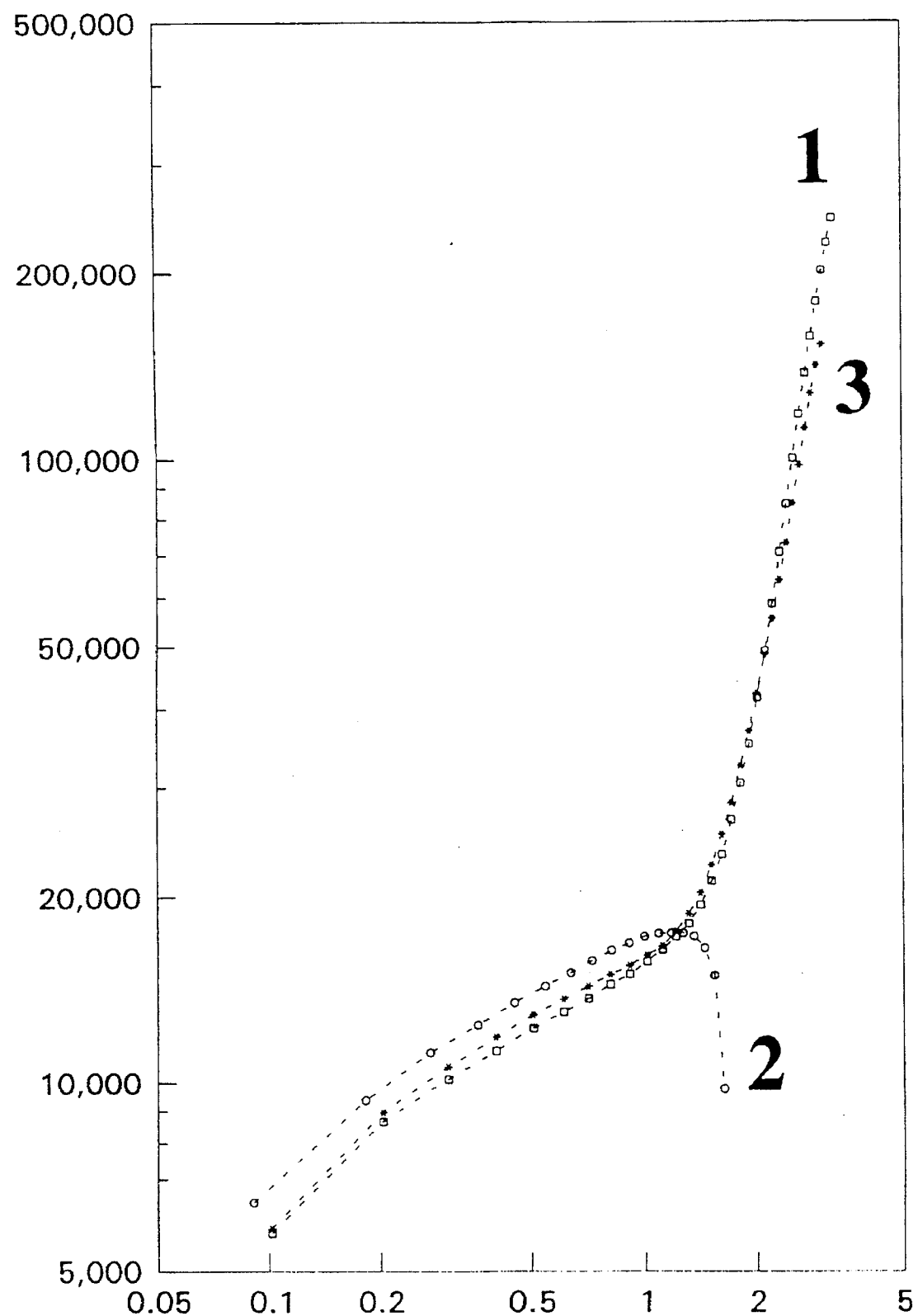

PROPYLENE POLYMER, PROCESS FOR OBTAINING IT AND USE

FIELD OF THE INVENTION

The present invention relates to a propylene polymer exhibiting specific rheological properties. It also relates to a process for obtaining this polymer and to its use for the shaping of articles by extrusion, calendering, injection moulding and thermoforming processes and for the manufacture of foams.

TECHNOLOGY REVIEW

Propylene polymers are known for their mechanical, chemical and electrical properties and for their heat resistance. Their relatively low cost makes them a material of choice for a large number of applications, such as the formation of shaped articles. Nevertheless, their theological properties and in particular their melt strength are such that they can be difficult to process by some methods such as extrusion, extrusion blowmoulding, calendering, film coating, coating and thermoforming. These polymers are furthermore rather unsuited for forming foams.

Various approaches have been used to solve this problem.

Accordingly, Patent Applications EP-A-384,431 and EP-A-190,889 describe propylene polymers exhibiting, in the molten state, an increase in the resistance to deformation during elongation or extension, known hereinafter more simply as structural stress-hardening, obtained by treating polymer powders with peroxides in the substantial absence of oxygen or by controlled irradiation of the said powders. The polymers thus obtained are suitable for processing by extrusion, calendering, injection moulding or thermoforming and are suitable for the formation of foams. However, the processes for obtaining them are lengthy, expensive and problematic to implement, especially if it is desired to obtain homogeneous and reproducible results. These polymers are therefore accessible with difficulty.

Attempts have also been made to improve the molten properties of propylene polymers by blending them with functional monomers, such as divinylbenzene, in the presence of a free radical generator and by subjecting the blend thus obtained to a heat treatment (Patent CA-A-680,211).

In Patent Applications JP-A-59/093,711 and EP-A-0,274,906, stabilizing agents and/or antioxidant additives are additionally added to this blend, before the heat treatment. These various processes result in polymers which do not simultaneously exhibit good melt strength and satisfactory thermal stability.

SUMMARY OF THE INVENTION

Propylene polymers have now been found which exhibit improved rheological properties in the molten state and in particular an increase in the resistance to deformation during elongation or extension and which do not exhibit the disadvantages of the compositions belonging to the prior art.

BRIEF DESCRIPTION OF THE DRAWING

The FIGURE represents RER diagrams of the variation, at 190° C., in the melt elongation viscosity as a function of time for an elongation gradient of 1. Curves 1, 2, and 3 correspond respectively to Examples 1, 2R, and 3R.

DETAILED DESCRIPTION OF THE INVENTION

Consequently, the present invention relates to a homo- or a copolymer of propylene containing monomer units derived from at least one functional compound (A) comprising at least two vinyl unsaturations and one or a number of aromatic rings which exhibits a structural stress-hardening.

Within the context of the present invention, structural stress-hardening of a polymer is understood to mean the property of the said polymer of exhibiting, in the molten state, an increase in its elongational viscosity during elongation or extension until the melt ruptures. This property is easily determined by means of rheometers which provide the change in the melt elongational viscosity as a function of the time for a given temperature and a given elongation gradient.

The homo- or copolymers of propylene according to the invention, known hereinafter more simply as propylene polymers, are chosen from homopolymers of propylene and copolymers of the latter containing at least 50% by weight of propylene and at least one other monomer. Mention may be made, as preferred examples of these other monomers, of $\alpha$-olefins containing from 2 to 20 carbon atoms, such as for example ethylene, 1-butene, 1-pentene, 1-hexene, methyl-1-butenes, methyl-1-pentenes, 1-octene and 1-decene.

Propylene copolymers is understood to mean both statistical copolymers (also called random copolymers) and block copolymers. These polymers are well known to a person skilled in the art.

The first generally consist of macromolecular chains in which the monomers are statistically distributed. The propylene content of these statistical copolymers is most often greater than or equal to 70% by weight and preferably greater than or equal to 75% by weight. The second ones consist of separate blocks of variable composition obtained during successive polymerization stages, each block generally consisting of a homopolymer of propylene or of another $\alpha$-olefin or consisting of a statistical copolymer comprising propylene and at least one other monomer chosen from the monomers mentioned above. Copolymers consisting of one block chosen from homopolymers of propylene and statistical copolymers of the latter and of another block chosen from copolymers of $\alpha$-olefins other than propylene are also regarded as block copolymers. The preferred block copolymers according to the invention contain a propylene homopolymer block and a propylene/ethylene and/or butene statistical copolymer block.

Homopolymers of propylene and copolymers of the latter with ethylene and/or 1-butene give good results.

It is obvious that the propylene polymer according to the present invention can consist of a single propylene polymer as defined above or of a blend of the said polymers.

According to an advantageous variant, the propylene polymer of the invention contains two propylene polymers as described above (polymers (P) and (Q)) which have different melt flow indices (MFI).

Within the context of the present invention, the MFI is measured at 230° C under a load of 2.16 kg according to ASTM standard D 1238 (1986). The polymer (P) is most often chosen from homo- and copolymers of propylene in which the MFI is from 0.1 to 20 g/10 min. Preferably, the MFI of the polymer (P) is at least 0.5 g/10 min and more particularly at least 1 g/10 min. Good results are obtained when the polymer (P) has an MFI of at most 10 g/10 min and more particullarly of at most 5 g/10 min. The polymer (Q) is most often chosen from homopolymers of propylene. Generally, the polymer (Q) has an MFI greater than 20 g/10 min and more particularly greater than or equal to 25 g/10 min. Polymers (Q) in which the MFI is greater than or equal to 30 g/10 min give good results. The MFI of the polymer (Q) is additionally generally at most 1000 g/10 min and more particularly at most 500 g/10 min.

Propylene polymers according to the present invention composed of a polymer (P) in which the MFI is from 0.5 to 5 g/10 min and of a polymer (Q) which is a homopolymer of propylene in which the MFI is from 40 to 100 g/10 min are particularly well suited.

The respective amounts of the polymers (P) and (Q) are generally such that their ratio by weight is from 0.05 to 50. The ratio by weight of the polymers (P) and (Q) is preferably at least 1. Good results are obtained when this ratio is from 1 to 10.

The propylene polymer according to the present invention preferably does not contain a polymer other than the propylene polymer or polymers.

The propylene polymers according to the present invention additionally contain monomer units derived from at least one functional compound (A) comprising at least two vinyl unsaturations and one or a number of aromatic rings. The preferred polymers according to the present invention are such that the functional compound (A) is divinylbenzene.

The content of monomer units derived from the functional compound (A) which are present in the propylene polymers according to the invention is at least 0.01 g per kg of polymer. This amount is furthermore advantageously greater than or equal to 0.1 and more particularly greater than or equal to 0.5 g per kg of polymer.

The maximum amount of monomer units derived from the compound (A) is not critical. However, for economic reasons, it is preferable that it is less than or equal to 50 g and most often less than or equal to 25 g per kg of polymer. Good results are obtained when this amount is less than or equal to 10 g per kg of polymer. Propylene polymers containing from 0.1 to 10 g of monomer units derived from functional compound (A) per kg of polymer are well suited.

The propylene polymers according to the invention additionally contain at least one antioxidant additive. This additive is often present in an amount of at least 0.1 g per kg of propylene polymer, preferably of at least 0.5 g and more particularly of at least 1 g per kg of propylene polymer. The amount of antioxidant additive is additionally most often less than or equal to 100 g and more particularly less than or equal to 50 g per kg of polymer. Amounts less than or equal to 10 g per kg of propylene polymer are particularly well suited.

Good results are obtained when the amount of antioxidant additive is from 0.5 to 10 g per kg of propylene polymer.

This antioxidant additive may be any antioxidant additive or any blend of antioxidant additives known for polyolefins. It may, for example, be chosen from compounds containing a sterically hindered phenol group, from phosphorus compounds and from compounds containing a thioether group. Good results are obtained with compounds containing a sterically hindered phenol group and phosphorus compounds. By way of examples of compounds containing a sterically hindered phenol group, it is possible to employ pentaerythrityl tetrakis(3,5-di-t-butyl-4-hydroxyphenylpropionate), stearyl β-(3,5-di-t-4-hydroxyphenyl)propionate, N,N'-bis (3-(3',5'-di-t-butyl-4'-hydroxyphenyl)propionyl)hexamethylenediamine, bis(β-(3, 5-di-t-butyl-4-hydroxyphenyl)ethyl)suberate, diethyl 3,5-di-t-butyl-4- hydroxybenzylphosphonate and calcium bis(ethyl (3,5-di-t-butyl-4-hydroxybenzyl)phosphonate). By way of phosphorus compounds, it is possible to use, for example, tris(2,4-di-t-butylphenyl) phosphite, tris(para-nonylphenyl) phosphite, tris(2,4-dinonylphenyl) phosphite and tetrakis(2, 4-di-t-butylphenyl) 4,4'-biphenylylenediphosphonite. As compounds containing a thioether group, mention may be made, for example, of distearyl thiodipropionate and dilauryl thiodipropionate.

When an alimentary application is intended, compounds containing a sterically hindered phenol group and phosphorus compounds are preferably employed, compounds comprising a thioether group being less suitable for these applications. Pentaerythrityl tetrakis(3,5-di-t-butyl-4-hydroxyphenylpropionate), tris(2,4-di-t-butylphenyl) phosphite and their blends are particularly well suited.

The propylene polymers according to the present invention can also contain other conventional additives such as additional antioxidant agents, antiacid agents, anti-UV agents, antistatic agents, dyes or filling materials. They can also contain monomer units derived from functional compounds other than the compounds (A). Mention may be made, as nonlimiting examples of these functional compounds other than the compounds (A), of maleic anhydride, styrene and ethylvinylbenzene.

The propylene polymers according to the present invention simultaneously exhibit good rheological properties and an excellent thermal stability. This thermal stability may, for example, be characterized by the induction period for the oxidation as defined hereinbelow with respect to the examples illustrating the present invention. The induction period for the propylene polymers according to the present invention is generally at least 10 minutes, preferably at least 20 minutes and more particularly at least 50 minutes.

The propylene polymers furthermore generally exhibit the advantageous properties described below. Their viscosity at low shear gradient is generally higher than that of the corresponding polymers which do not contain monomer units derived from functional compound (A). They furthermore most often exhibit a particularly high crystallization temperature and a particularly high crystallization rate which results in an improvement in their transparency and in their stiffness. They can also be used at higher rates than those used for conventional propylene polymers.

It is also noted that, when the propylene polymer is a block copolymer, the dispersion of the two blocks is remarkably fine and homogeneous, which results in an improvement in the mechanical properties. This property is particularly advantageous for block copolymers containing a crystalline propylene block and an elastomeric propylene/ethylene block for which a better dispersion of the elastomeric phase in the crystalline phase results in an improvement in the stiffness/impact strength compromise.

It is also noted that the propylene polymers according to the present invention contain few, and most often advantageously no, agglomerates which cannot melt during their use.

However, the propylene polymers according to the present invention advantageously contain few, and preferably no, fractions which are insoluble in hot xylene. For this reason, the articles shaped from these polymers exhibit only very few, and advantageously no, imperfections. This polymer fraction which is insoluble in hot xylene is most often less than 20% by weight, preferably less than 10% by weight and more particularly less than 1% by weight.

The propylene polymers according to the present invention exhibit, in the melt, rheological properties which make them particularly well suited to the production of articles shaped by extrusion and in particular by extrusion blow-moulding or injection blow-moulding, thermoforming or coating. They are particularly well suited to the manufacture of foams. These uses consequently constitute additional aspects of the present invention. The propylene polymers which exhibit a high melt flow index are advantageously suitable for high-rate injection.

The propylene polymers according to the invention which are composed of the polymers (P) and (Q) furthermore exhibit the advantage of having a particularly high stiffness.

The present invention also relates to a specific process for the preparation of the propylene polymers according to the present invention.

To this end, the present invention relates to a continuous process for the preparation of propylene polymers by melt-blending at least one propylene polymer, at least one functional compound (A) such as defined above and at least one free radical generator in an extruder comprising, at its outlet, a compression zone preceding a discharge zone, in which at least one anti-oxidant additive is introduced into the melt at the latest before the entry of the latter into the said compression zone.

Extruder is understood to denote any continuous device comprising a feed zone and, at its outlet, a discharge zone preceded by a compression zone, the latter forcing the melt to pass through the discharge zone.

The extruder can in particular comprise the following parts:

(1) a main feed hopper at the inlet of the extruder, (2) optionally one or a number of devices for delayed feeding which make it possible to introduce, simultaneously or separately, the propylene polymer, the functional compound (A) and the free radical generator (hereinafter known more simply as generator), (3) one or a number of screw components which make it possible to propagate the material to be extruded, (4) optionally one or a number of kneader components which make it possible to blend the material to be extruded, it optionally being possible to alternate the screw components and the kneader components, (5) one or a number of heating zones which make it possible to melt the propylene polymer and to react the various reactants in the melt, (6) at the outlet, a compression zone followed by a discharge zone, the function of the compression zone being to compress the material to be extruded in order to force it through the discharge zone of the extruder, (7) a device for delayed feeding arranged at a point situated after the introduction of the functional compound (A) and the generator, where the mass comprising the polyolefin, the compound (A) and the generator is already molten, and before the material to be extruded enters the abovementioned compression zone (6).

The parts (1) to (6) are not necessarily arranged in this order.

The discharge zone of the extruder can be followed by a granulation device or by a device which gives the extruded material a shaped form such as a film.

The extruder which can be used in the process according to the invention can also contain, preferably after the zone (5), a degassing zone, in order to remove the excess amounts of compound (A), of unreacted generator and optionally the by-products generated during the extrusion. The extruders which may be suitable in the process according to the invention are in particular extruders of single-screw type, extruders of the co-kneader type such as, for example, extruders marketed by the company Buss, extruders of the intermeshing or non-intermeshing co-rotating twin-screw type, extruders of the intermeshing or non-intermeshing counter-rotating twin-screw type and extruders of the multi-screw type. Use is preferably made of an extruder of the co-header type or of the intermeshing co-rotating twin-screw type.

In the process according to the invention, the propylene polymer(s), the functional compound(s) (A) and the generator(s) are introduced into the extruder. These three reactants can be introduced simultaneously, optionally by blending them beforehand, preferably while dry and at ambient temperature, for example in a mechanical blender. These three reactants can also be introduced separately in any order, for example by introducing first the propylene polymer and then simultaneously the compound (A) and the generator, the compound (A) and the generator optionally being blended beforehand. It is also possible to introduce first the propylene polymer and the compound (A), optionally after having blended them beforehand, and then to add the generator thereto. It is also possible to introduce the three reactants in three successive stages, for example first the propylene polymer, then the functional compound (A) and then the generator. It may prove to be advantageous to introduce the functional compound (A) and the generator (separately or simultaneously) after melting the propylene polymer, in order to optimize the homogenization of the blend.

In the process according to the invention, it is essential that the introduction of the antioxidant additive takes place with a delay, namely in a delayed and separate feed stage, at the time when the functional compound (A) and the generator have already been introduced and are present within the melt comprising the propylene polymer, the compound (A) and the generator, and before the mass has entered the compression zone preceding the discharge zone of the extruder. If the introduction of the antioxidant additive takes place at the same time or before the introduction of one of the other reactants, or alternatively before the mass has melted, or alternatively at the same time or after the entry of the mass into the abovementioned compression zone, a propylene polymer exhibiting both excellent rheological properties and a high thermal stability is not obtained. "Delayed introduction of the antioxidant additive" is understood to denote the introduction of the antioxidant additive (s), in a single step or in the form of a staged introduction, into the melt at the latest before the entry of the latter into the compression zone of the extruder.

In order to avoid all the problems which may be attributed to the presence of solvent or of diluent in the final polymer, it is generally preferable to introduce the antioxidant additive in the form of a powder.

In a first variant of the process according to the invention, the propylene polymer used contains the two polymers (P) and (Q) described above. In this case, the polymers (P) and (Q) are introduced into the extruder at the latest at the same time as the functional compound (A). These two polymers are preferably introduced into the extruder in the form of a blend via the main feed hopper. This first variant has the advantage of being able to adjust the MFI of the propylene polymer according to the invention to the application for which it is intended.

According to a second variant of the process according to the invention, a first part of the propylene polymer is introduced into the main feed hopper at the inlet of the extruder and a second part of the said propylene polymer, with a delay, is introduced simultaneously with the antioxidant additive. The latter is then advantageously blended beforehand with the second part of the propylene polymer. The antioxidant additive can also be introduced with a propylene polymer different from that introduced via the main feed hopper.

In a third variant of the process according to the invention, a small amount of stabilizing agent, hereinafter known as "prestabilizing agent", is added to the propylene polymer before or at the time of the introduction of the latter into the extruder and thus before the introduction of the antioxidant additive.

This third variant proves to be particularly effective when the propylene polymer used is a virgin polymer exiting from the polymerization reactor without having been subjected to a subsequent treatment. The prestabilizing agent then has the function of protecting the said propylene polymer against any degradation from the melting stage and of lessening the possible phenomena of corrosion of the extruder.

It is obvious that these different variants can be combined with one another.

The conditions under which the process according to the invention is implemented are such that there is melt-blending of the various reactants. The process according to the invention is furthermore generally implemented under conditions such that there is at least partial reaction of the molecules of the functional compound (A) with one another and/or with the propylene polymer under the effect of the free radicals produced by the generator. This process is preferably implemented under conditions such that there is at least partial reaction of the functional compound (A) with the propylene polymer so that a part of the macromolecular chains of the propylene polymer are bonded to one another via monomer units of the compound (A). The temperature of the melt consequently depends on the nature of the propylene polymer and of the free radical generator. It is generally at least 100° C., most often at least 130° C. and in particular at least 140° C. Generally, the operation is carried out at a temperature of the melt not exceeding 350° C., most often not exceeding 300° C. and more particularly not exceeding 250° C.

Good results are obtained with temperatures of 160° to 250° C.

The duration of the process depends on the amounts of the reactants used, on the chemical nature of these reactants, on the temperature, on the type of extruder used, on the rotational speed of its screw(s) and on its throughput. The duration is most often from 1 second to i hour, preferably from 5 seconds to 30 minutes and more particularly from 10 seconds to 10 minutes. Durations of at most 5 minutes are generally sufficient to produce the propylene polymers according to the present invention. The propylene polymer used is preferably a virgin polymer. As has already been mentioned, different propylene polymers can be used in the process according to the present invention. However, generally only propylene polymers are used as polymer and, in the case where a number of propylene polymers are used, preferably only the polymers (P) and (Q) defined above are used.

In this specific case, the respective amounts of the two polymers are generally such that their ratio by weight is from 0.05 to 50.

This ratio is preferably at least 1. Good results are obtained when this ratio is from 1 to 10.

The amount of compound (A) used is generally at least 0.05 g per kg of propylene polymer used, preferably at least 0.1 g and more particularly at least 1 g per kg of propylene polymer used. This amount is furthermore most often at most 75 g and generally at most 40 g per kg of propylene polymer used. Good results are obtained when at most 25 g of compound (A) per kg of propylene polymer are used. Amounts of functional compounds (A) from 1 to 10 g per kg of propylene polymer are well suited.

The propylene polymer and the functional compound (A) are melt-blended in the presence of a free radical generator. Use is preferably made, as examples of free radical generator, of organic peroxides. The latter advantageously have a half-life of at least 1 minute at 170° C. Mention may be made, as typical examples, of t-butyl cumyl peroxide, $\alpha,\alpha'$-bis(t-butylperoxyisopropyl)benzene, 3,5-bis(t-butylperoxy)-3,5-dimethyl-1,2-dioxolane, di-t-butyl peroxide, 2,5-dimethyl-2,5-di-t-butylperoxyhexane, p-menthane hydroperoxide, pinane hydroperoxide, diisopropylbenzene mono-$\alpha$-hydroperoxide, cumene hydroperoxide, t-butyl hydroperoxide and their blends. The preferred generators are $\alpha,\alpha'$-bis(t-butylperoxyisopropyl)benzene and 2,5-dimethyl-2,5-di-t-butylperoxyhexane.

The generator is generally used in an amount which is sufficient to make it possible for the molecules of functional compound (A) to react with one another and/or with the propylene polymer chains. Moreover, it is desirable that the amount does not exceed the necessary amount because any excess generator leads to degradation of the propylene polymer. The amount is usually at least equal to 0.05 g per kg of propylene polymer, in particular at least equal to 0.1 g per kg, the values of at least 0.2 g per kg of propylene polymer being the most advantageous. In general, the amount does not exceed 10 g, preferably does not exceed 5 g and more particularly does not exceed 1 g per kg of propylene polymer. Goods results are obtained when the amount of free radical generator is from 0.1 to 5 g per kg of propylene polymer, the values of approximately 0.4 g per kg being the most recommended.

The antioxidant additive used has the function of neutralizing the excess of radicals present in the extruder and of conferring thermal stability on the propylene polymer obtained. Its use according to the present invention is also essential for conferring on the propylene polymers, simultaneously, the good rheological and thermal properties described above.

The total amount of antioxidant additive depends largely on the amount of generator used and on the application targeted for the propylene polymer. The total amount is generally at least equal to 0.01 g, usually at least equal to 0.1 g and preferably at least 0.5 g per kg of propylene polymer used. This total amount is furthermore most often less than or equal to 100 g, preferably less than or equal to 50 g and more particularly less than or equal to 10 g per kg of propylene polymer. Good results are obtained when the amount of antioxidant additive is from 0.1 to 10 g per kg of propylene polymer, amounts of approximately 3 g of antioxidant additive per kg of polymer being the most common.

When use is made of a prestabilizing agent as described above, this prestabilizing agent can be chosen from conventional stabilizing agents such as anti-UV agents, antiacid agents, antioxidant agents and their mixtures. Antioxidant agents are especially preferred. The total amount of prestabilizing agent used in this embodiment must be low in order not to compromise the reactions between the various reactants. It does not exceed, in general, 1.0 g per kg of propylene polymer used, it is most often less than or equal to 0.5 g and more particularly less than or equal to 0.1 g per kg of propylene polymer. The total amount of prestabilizing agent is usually at least equal to 0.005 g per kg of propylene polymer used, preferably at least 0.03 g per kg and more particularly at least 0.05 g per kg of propylene polymer used.

During the extrusion, it is also possible to incorporate in the propylene polymers according to the present invention, at any time, other usual additives for propylene polymers such as, by way of nonlimiting examples, stabilizing agents, antiacid agents, antistatic agents, organic or inorganic dyes, foaming agents and filling materials such as glass fibres. The antiacid agents are advantageously introduced at least partially via the main hopper.

The process according to the present invention, thus defined, makes it possible, in a particularly simple and reproducible way, to obtain the propylene polymers described above. In particular, the process according to the invention has the significant advantage of containing only a single melt-blending stage, which makes it particularly economical.

In a specific variant, the process according to the present invention furthermore comprises a purification stage for the propylene polymer. This additional treatment has the function of removing all the volatile compounds and in particular the residues of unreacted functional compound (A). It also makes it possible, if necessary, to recover the said functional compounds.

The purification treatment used in the process according to the present invention comprises a treatment of granules of propylene polymer according to the present invention by a gas stream.

To this end, the polymer resulting from the discharge zone of the extruder is granulated and then brought into contact with a gas stream which may be a stream of hot air, a gas stream containing steam or a stream of steam. Treatment of the granules by a gas stream containing steam gives good results. In this specific case, the gas stream is generally composed of a gas such as nitrogen or air, air being preferred.

Treatment of the granules by a stream of steam is particularly preferred.

The operating conditions (temperature, duration, pressure) under which this purification treatment is carried out can vary within wide limits, in as much as there is diffusion of the molecules of unreacted functional compound (A) towards the surface of the polymer granules and entrainment of the latter by the gas stream. The operation is preferably carried out under conditions such that melting and/or degradation of the propylene polymer are avoided.

The temperature is generally at least 70° C. and more precisely at least 80° C., values of at least 90° C. being the most common. The temperature is furthermore generally less than or equal to 200° C. and most often less than or equal to 160° C., values of at most 120° C. being the most used. Good results are obtained when the temperature is approximately 100° C.

The duration of the purification treatment is conditioned, inter alia, by the residual content of compound (A), by the kinetics of diffusion of the said compounds in the granules, by the heat exchanges of the devices used and by the applications desired for the propylene polymer. The duration of this treatment is generally at least approximately 30 minutes and more particularly at least approximately 2 hours, durations of at least approximately 10 hours being the most common. This duration, however, generally does not exceed approximately 140 hours and most often does not exceed approximately 120 hours, durations of at most 100 hours being preferred.

When the purification treatment is carried out by bringing the granules of propylene polymer into contact with a gas stream containing, or composed of, steam, the total amount of steam is generally at least 0.05 kg, preferably at least 0.2 kg and more particularly at least 0.5 kg per kg of granules of propylene polymer. In general, this amount is less than or equal to 20 kg, most often less than or equal to 10 kg and more particularly less than or equal to 5 kg of steamper kg of granules of polymer.

According to the invention, the purification treatment of the propylene polymers can be carried out continuously or batchwise. The device used for this purification treatment may be any receptacle into which the granules of propylene polymer are introduced and in which a gas purging is carried out. The gas stream is preferably introduced at the lower end of the receptacle.

This device furthermore advantageously contains a conventional device intended for the purification of the effluents and optionally for the recovery and for the recycling of the functional compound (A). When the purification treatment has been carried out by using steam, the granules of propylene polymer are subsequently preferentially dried by any means known for this purpose.

The propylene polymers thus obtained only contain a very small amount of free functional compound (A). According to the present invention, amount of free functional compound (A), hereinafter known more simply as (QA), is understood to mean the amount of compound (A) quantitatively determined in the test described hereinafter with respect to the examples illustrating the invention. Polymers are thus obtained in which the (QA) is less than 100 mg per kg and preferably less than 20 mg per kg of propylene polymer. The polymers according to the present invention which have been subjected to the purification treatment are advantageously such that their (QA) is less than or equal to i mg, preferably less than or equal to 0.5 mg and more particularly less than or equal to 0.1 mg per kg of propylene polymer. The propylene polymers thus defined can be used in alimentary applications and in any other application in which a high purity is required. They furthermore have the advantage of not giving off volatile compounds during their subsequent use. For this reason, problems of smell and/or of safety related to the presence of volatile compounds are not encountered and the articles obtained, at the time of the said uses, do not contain bubbles generated by the said compounds. These specific polymers consequently constitute a specific subject of the present invention.

EXAMPLES

The following examples serve to illustrate the invention. Examples 2R and 3R are given by way of comparison. The meaning of the symbols used in these examples, the units expressing the quantities mentioned and the methods for measuring these quantities are explained below.

IP: Induction period for the oxidation of the propylene polymer at 180° C., expressed in minutes. The induction period is measured by differential thermal analysis, during which the propylene polymer is subjected to oxidation under oxygen at a constant temperature of 180° C. and the time which passes until the appearance of an exothermic phenomenon caused by oxidation of the propylene polymer is measured. The induction period is a measurement of the thermal stability.

QA: Amount of free functional compound (A) expressed in mg per kg of propylene polymer. This value is obtained by grinding 50 g of granules in liquid nitrogen using a ball mill, by subjecting, for 16 hours, 40 g of ground material to an extraction treatment with acetone in a Soxhlet extractor and by quantitatively determining, after concentrating by evaporation, the amount of compound (A) present in the acetone by high pressure liquid chromatography.

Examples 1 to 4 and 7 were carried out using a co-rotating twin-screw extruder of Werner & Pfleiderer ZSK 25 type, fitted out so that it comprises the following parts:
(a) a main feed hopper at the inlet of the extruder, intended for introducing the propylene polymer and optionally additives for the latter;
(b) a device for delayed feeding intended for introducing the functional compound (A) and the free radical generator;
(c) two first water-cooled screw components corresponding to the feeds (a) and (b);
(d) a zone heated to 180° C. in order to make it possible to melt the polymer and to react in the melt;
(e) a device for delayed feeding arranged at a point situated after the introduction of the functional compound (A) and of the free radical generator and where the mass comprising the polymer, the compound (A) and the generator is already molten. This second device is intended for introducing the antioxidants and, optionally, a propylene polymer identical to, or different from, that introduced in
(f) a compression zone followed by a discharge zone, the function of the first being to compress the material to be extruded through the second.

The rotational speed of the screws of the extruder was 150 rev/min.

Examples 5 and 6R were carried out with a ZSK 40 extruder fitted out in the same way as the above ZSK 25 extruder. The rotational speed of the screws of this extruder is 300 rev/min. The elongational viscosity of the propylene polymers is determined using a rheometer marketed by Rheometrics under the name Rheometrics Extentional Rheometer RER-9000. The curves reproduced in the single appended figure (hereinafter known as the PER diagrams) represent the variation, at 190° C., in the melt elongational viscosity (expressed in Pa's) as a function of time (expressed in s) for an elongation gradient (expressed in $s^{-1}$) of 1. Curves 1, 2 and 3 correspond respectively to Examples 1, 2R and 3R.

Example 1

The extruder is fed, via the hopper (a), at a throughput of 8 kg/h, with a propylene polymer marketed under the name Eltex® P HL 001 P by Solvay (SA). A blend containing, per 1,000 parts by weight, 925 parts of a 55% by weight of divinylbenzene and 45% by weight of ethylvinylbenzene blend (this blend, hereinafter known more simply as DVB, is purified beforehand over alumina) and 75 parts of 2,5-dimethyl-2,5-di-t-butylperoxyhexane (DHBP) is introduced via the device (b) under a nitrogen stream and at a throughput of 40 g/h.

A propylene polymer marketed under the name Eltex P HY 001 P by Solvay containing, per kg, 4.5 g of pentaerythrityl tetrakis(3,5-di-t-butyl-4-hydroxyphenylpropionate) (AO1), 5.0 g of tris(2,4-di-t-butylphenyl) phosphite (AO2) and 6 g of calcium stearate (CaSt) is introduced via the second feed device (e) at a throughput of 2 kg/h.

The product exiting from the extruder exhibits the following characteristics:

MFI: 1.6

IP: 69 min

Crystallization temperature: 129° C.

The PER diagram of this polymer shows that it exhibits the phenomenon of structural stress-hardening.

Example 2R

Example 1 is repeated, except that the propylene polymer introduced via the hopper (a) contains, per kg, 1.5 g of CaSt, 1.13 g of AO1 and 1.25 g of AO2 and that the Eltex HY 001 P polymer is introduced via the device (e) in the absence of AO1, of AO2 and of CaSt.

The product exiting from the extruder exhibits the following characteristics:

MFI: 3.4

IP: 23 min

Crystallization temperature: 123° C.

The RER diagram shows the absence of structural stress-hardening. Both a decrease in the rheological properties and in the thermal stability are therefore observed.

Example 3R

Example 1 is repeated in every respect, except that the polymer introduced via the device (e) is free of additive.

The product exiting from the extruder exhibits the following characteristics:

MFI: 2.9

IP: 0 min

Crystallization temperature: 128° C.

The RER diagram shows a structural stress-hardening which is less than that of Example 1 and the polymer has no thermal stability.

Example 4

The preparation is carried out as described in Example 1, except that the hopper (a) is fed with Eltex P HL 001 P polymer containing 1.5 g/kg of CaSt and that the DVB introduced via the device (b) contains 62% by weight of divinylbenzene and 38% by weight of ethylvinylbenzene.

A granulator arranged at the outlet of the extruder delivers a product in which the (QA) is approximately 2 g per kg.

These granules are continuously introduced into a silo through which a stream of steam passes from the bottom upwards. The steam throughput is adjusted so as to provide a homogeneous temperature of 100° C. throughout the silo and the amount of steam used is approximately I kg per kg of granules. The residence time of the granules in the silo is approximately 85 hours.

The mixture of steam and of organic effluent emerging from the silo is then condensed and the aqueous and organic phases are recovered and treated. The polymer granules are transferred by gravity into a second silo in order to be dried therein, for approximately 6 hours, by a stream of air at 60° C. The propylene polymer thus obtained has a (QA) of less than 1 mg/kg.

Example 5

This example illustrates a propylene polymer according to the invention composed of two polymers of different MFI. The preparation is carried out as in Example 1, except that:
- a blend consisting of 59% by weight of Eltex P HL 001 P polymer (MFI 1.8 g/10 min—polymer (P)) and 41% by weight of Eltex P HY 001 P polymer (MFI: 45 g/10 min—polymer (Q)) is introduced at a throughput of 80 kg/h via the hopper (a),
- the introduction of the DVB and of the DHBP via the device (b) is carried out at a throughput of 0.4 kg/h, and
- the introduction via the device (e) is carried out at a throughput of 8 kg/h.

The polymer obtained exhibits structural stress-hardening, an MFI of 4 g/10 min and a flexural elasticity modulus (Flex Mod), measured at 23° C. according to ISO standard 178 (test specimen injected with a thickness of 4 mm), of 2240 MPa.

Example 6R

The preparation is carried out as in Example 5, except that the introduction of DVB and DEBP is omitted.

A polymer is thus obtained which does not exhibit structural stress-hardening, the MFI of which is 7.4 g/10 min and the Flex Mod of which is 1590 MPa.

Example 7

The preparation is carried out in every respect as in Example 1, except that Eltex P HL 001 P polymer containing, per kg, 20 g of (AO1), 20 g of (AO2) and 10 g of CaSt is introduced via the device (e) at a throughput of 1 kg/h and that the throughput for introduction of the polymer via the hopper (a) is 9 kg/h.

A polymer is thus obtained which exhibits structural stress-hardening, the MFI of which is 1 and the IP of which is greater than 60 min.

What is claimed is:

1. A melt-blended polymer of propylene containing monomer units derived from at least one functional compound comprising at least two vinyl unsaturations and at least one aromatic ring which exhibits a structural stress-hardening characterized by a molten state increase in elongational viscosity during elongation or extension before melt rupture, and having an induction period for oxidation of at least 10 minutes.

2. The propylene polymer according to claim 1, in which the propylene polymer is chosen from homopolymers of propylene and copolymers of propylene containing at least 50% by weight of propylene and at least one other monomer chosen from α-olefins containing from 2 to 20 carbon atoms.

3. The propylene polymer according to claim 2, in which the propylene polymer contains two propylene polymers which have different melt flow indices.

4. The propylene polymer according to claim 3, in which one polymer is a propylene polymer in which the melt flow index is from 0.5 to 5 g/10 min and the other polymer is a homopolymer of propylene in which the melt flow index is from 40 to 100 g/10 min.

5. The propylene polymer according to claim 1, in which the functional compound is divinylbenzene.

6. The propylene polymer according to claim 1, in which the content of monomer units derived from the functional compound is at least 0.01 g per kg of polymer.

7. The propylene polymer according to claim 1 containing an antioxidant additive.

8. The propylene polymer according to claim 7, in which the amount of antioxidant additive is from 0.5 to 10 g per kg of polymer.

9. A continuous process for the melt-blended preparation of a propylene polymer containing monomer units derived from at least one functional compound comprising at least two vinyl unsaturations and at least one aromatic ring which exhibits a structural stress-hardening said process comprising melt-blending a propylene polymer, at least one functional compound and a free radical generator in an extruder comprising, at its outlet, a compression zone preceding a discharge zone, in which at least one antioxidant additive is introduced into the melt at the latest before the entry of the latter into the said compression zone.

10. The process according to claim 9, in which use is made of a polymer containing two propylene polymers which have different melt flow indices.

11. The process according to claim 9, in which the amount of said at least one functional compound used is from 1 to 10 g per kg of propylene polymer.

12. The process according to claim 9, in which the amount of free radical generator used is from 0.1 to 5 g per kg of propylene polymer.

13. The process according to claim 9, comprising a purification stage for the propylene polymer.

14. The process according to claim 13, in which the polymer resulting from the discharge zone of the extruder is granulated and is then brought into contact with a gas stream which may be a stream of hot air, a gas stream containing steam or a stream of steam.

15. The propylene polymer according to claim 1, in which the amount of free functional compound is less than or equal to 1 mg per kg of propylene polymer.

16. A shaped article obtained by extrusion blow-moulding or injection blow-moulding, thermoforming or coating, comprising a polymer according to claim 1.

17. A foam comprising a polymer according to claim 1.

18. A continuous process as set forth in claim 9, including reacting at least a portion of said at least one functional compound with another portion of said at least one functional compound, a portion of said propylene polymer, or both another portion of said functional compound and a portion of said propylene polymer.

19. The continuous process as set forth in claim 9, including reacting at least a portion of said at least one functional compound with said propylene polymer to bond parts of said propylene polymer to one another via monomer units of said at least one functional compound.

20. A propylene polymer prepared by melt-blending at least one propylene polymer, at least one functional compound comprising at least two vinyl unsaturations and at least one aromatic ring and at least one free radical generator in an extruder comprising, at its outlet, a compression zone preceding a discharge zone, in which at least one antioxidant additive is introduced into the melt before the entry of the melt into the said compression zone.

21. The polymer according to claim 20, which exhibits at the same time a structural stress hardening and a thermal stability such that the induction period for oxidation is at least 10 minutes.

22. The polymer according to claim 20, in which the propylene polymer is selected from homopolymers and copolymers of propylene containing at least 50% by weight of propylene and at least one other monomer selected from α-olefins containing from 2 to 20 carbon atoms.

23. The polymer according to claim 22, prepared by using two propylene polymers, which have different melt flow indices.

24. The polymer according to claim 23, in which one polymer is a propylene polymer in which the melt flow index is from 0.5 to 5 g/10 min and the other polymer is a homopolymer of propylene in which the melt flow index is from 40 to 100 g/10 min.

25. The polymer according to claim 20, in which the functional compound is divinylbenzene.

26. The polymer according to claim 20, in which the amount of functional compound used is from 1 to 10 g per kg of propylene polymer.

27. The propylene according to claim 20, in which the amount of free radical generator used is from 0.1 to 5 g per kg of propylene polymer.

28. The polymer according to claim 20 having been submitted to a purification stage.

29. The polymer according to claim 28, wherein the polymer resulting from the discharge zone of the extruder is granulated and is then brought into contact with a gas stream which may be a stream of hot air, a gas stream containing steam or a stream of steam.

30. The polymer according to claim 29, in which the amount of free functional compound is less than or equal to 1 mg per kg of propylene polymer.

31. A shaped article comprising a polymer according to claim 20, prepared by extrusion blow-moulding or injection blow-moulding, thermoforming or coating.

32. A foam comprising a polymer according to claim 20.

* * * * *